(12) United States Patent
Kuromizu

(10) Patent No.: US 8,313,207 B2
(45) Date of Patent: Nov. 20, 2012

(54) SUPPORT UNIT, BACKLIGHT UNIT, DISPLAY DEVICE, AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/122,213

(22) PCT Filed: Aug. 21, 2009

(86) PCT No.: PCT/JP2009/064647
§ 371 (c)(1),
(2), (4) Date: Apr. 1, 2011

(87) PCT Pub. No.: WO2010/044314
PCT Pub. Date: Apr. 22, 2010

(65) Prior Publication Data
US 2011/0187945 A1    Aug. 4, 2011

(30) Foreign Application Priority Data

Oct. 14, 2008    (JP) .................................. 2008-265321

(51) Int. Cl.
*F21V 33/00*    (2006.01)
(52) U.S. Cl. ..................... 362/97.4; 362/219
(58) Field of Classification Search ................ 362/97.4, 362/219
See application file for complete search history.

(56) References Cited

U.S. PATENT DOCUMENTS

| 5,486,983 | A | 1/1996 | Cordier et al. | |
|---|---|---|---|---|
| 7,070,313 | B2 * | 7/2006 | Kim et al. | 362/561 |
| 7,382,423 | B2 * | 6/2008 | Chang et al. | 349/64 |
| 7,604,390 | B2 * | 10/2009 | Zhang et al. | 362/634 |
| 2003/0137616 | A1 | 7/2003 | Noborio | |
| 2005/0219431 | A1 | 10/2005 | Chang et al. | |
| 2006/0146512 | A1 | 7/2006 | Choi | |
| 2007/0009820 | A1 | 1/2007 | Ueda | |
| 2007/0053171 | A1 | 3/2007 | Park | |
| 2008/0111937 | A1 * | 5/2008 | Chen | 349/58 |
| 2009/0046445 | A1 * | 2/2009 | Namiki et al. | 362/97.2 |
| 2009/0279320 | A1 | 11/2009 | Yokota et al. | |
| 2010/0284172 | A1 * | 11/2010 | Yokota | 362/97.1 |

FOREIGN PATENT DOCUMENTS

| JP | 2006-185889 A | 7/2006 |
|---|---|---|
| JP | 2006-330659 A | 12/2006 |
| JP | 2007-018903 A | 1/2007 |
| JP | 2007-073527 A | 3/2007 |
| JP | 2007-250268 A | 9/2007 |
| JP | 2007-322697 A | 12/2007 |
| JP | 2008-066283 A | 3/2008 |
| JP | 2008-146970 A | 6/2008 |
| RU | 4693 U1 | 8/1997 |
| RU | 2 330 318 C1 | 7/2008 |

OTHER PUBLICATIONS

Official Communication issued in International Patent Application No. PCT/JP2009/064647, mailed on Sep. 15, 2009. English translation of Official Communication issued in corresponding Russian Patent Application No. 2011119487, mailed on Jul. 23, 2012.

* cited by examiner

*Primary Examiner* — Laura Tso
(74) *Attorney, Agent, or Firm* — Keating & Bennett, LLP

(57) ABSTRACT

A support unit (11) includes a support pin (12) passing through both a sheet opening (21H) and a chassis opening (63H) which are superposed on each other and making contact with a diffusion plate (64), a shield section (13) for covering the sheet opening (21H), and members, such as a latch body (14) and the shield section (13), making the support unit (11) unmovable relative to a backlight chassis (63).

20 Claims, 15 Drawing Sheets

SUPPORT UNIT, BACKLIGHT UNIT, DISPLAY DEVICE, AND TELEVISION RECEIVER

TECHNICAL FIELD

The present invention relates to a support unit mounted in a backlight unit that is an illuminator, the backlight unit itself, a display device (such as a liquid crystal display device) that utilizes light from the backlight unit, and a television receiver that is a display device capable of receiving radio waves for television broadcasting.

BACKGROUND ART

As shown in FIG. 14, in a liquid crystal display device 189 including a non-light-emitting type liquid crystal display panel 179, a backlight unit 169 that is an illuminator further is mounted. In a case where the backlight unit 169 uses a fluorescent tube 161 as a light source, a lamp holder 191 is used to stably fix the fluorescent tube 161 to a backlight chassis (chassis) 163.

As shown in FIG. 15, the lamp holder 191 includes a clip 192 for gripping the fluorescent tube 161, a support pin 112 that comes in contact with a diffusion sheet 164 and thereby supports an optical sheet group 166 including the diffusion sheet 164, a base portion 193 that supports the clip 192 and the support pin 112, and a hook 194 that is fitted into a chassis opening 163H on a bottom portion 163B of the backlight chassis 163 and thereby fixes the base portion 193 (and accordingly, the lamp holder 191 itself) (the lamp holder 191 is referred to also as a support unit since it supports the optical sheet group 166).

To be more specific, the hook 194 is fitted into the chassis opening 163H from the side of a front surface 163Bf of the backlight chassis 163, which faces the fluorescent tube 161, and thus the lamp holder 191 is fixed to the bottom portion 163B (a reflection sheet 195 also includes an opening 195H, and the hook 194 is fitted also into the opening 195H). The lamp holder 191 grips the fluorescent tube 161 positioned on the side of the front surface 163Bf of the bottom portion 163B by the lamp clip 192 and supports the diffusion sheet 164 and the like by the support pin 112.

LIST OF CITATIONS

Patent Literature

Patent Document 1: JP-A-2007-73527

SUMMARY OF THE INVENTION

Technical Problem

In the above-described backlight unit 169, in many cases, an inverter unit that supplies an electric current to the fluorescent tube 161, a power source unit that supplies an electric current to various members, and the like are mounted on the side of a rear surface 163Br of the backlight chassis 163. In such a case, circuits to which a high voltage is applied (for example, an inverter transformer and a power source circuit) in the inverter unit and the power source unit are brought extremely close to the backlight chassis 163 made of metal. This makes it likely that leakage occurs between these circuits and the backlight chassis 163.

One possible solution to this is, as shown in the cross-sectional view of FIG. 16, to cover the rear surface 163Br of the backlight chassis 163 with an insulation sheet 121 (in the figure, the reflection sheet 195 covering the front surface 163Bf of the backlight chassis 163 is omitted for the sake of convenience). In this case, however, it is required that a sheet opening 121H for passing the hook 194 therethrough be formed through the insulation sheet 121. Moreover, the sheet opening 121H is set to have an area larger than that of the chassis opening 163H in order to prevent the insulation sheet 121 from overlapping an opening region of the chassis opening 163H.

As a consequence of this, an edge region of the chassis opening 163H defined by an edge of the chassis opening 163H and the vicinity thereof is exposed from the sheet opening 121H, which makes it likely that leakage occurs between the exposed region and, for example, a metal terminal 138P of an inverter transformer 138.

The present invention has been made to solve the above-described problem. It is an object of the present invention to provide a support unit that, in a case where an insulation sheet including a sheet opening is covering a rear surface of a backlight chassis, covers part of the backlight chassis, which is exposed from the sheet opening, a backlight unit including the support unit, a display device including a backlight, and a television receiver that is a display device capable of receiving radio waves for television broadcasting.

Solution to the Problem

With respect to an insulation sheet and a chassis each including an opening and adhered to each other so that the openings overlap each other, a support unit is mounted to the chassis by being fitted into the two openings. The support unit includes: a support pin whose top end projects from a front surface of the chassis when the support pin is passed through the two openings that are a sheet opening included in the insulation sheet and a chassis opening included in the chassis; a shield portion that is continuous with a bottom end of the support pin and covers over the sheet opening of the insulation sheet adhered to a rear surface of the chassis; and a fixing portion that engages with the chassis so as to immobilize the support unit itself with respect to the chassis.

According to this configuration, in the support unit, the support pin projects from the shield portion. Thus, in order for the support pin to project from the front surface of the chassis via the sheet opening and the chassis opening, the support pin of the support unit is passed through the sheet opening of the insulation sheet covering the rear surface of the chassis and further through the chassis opening. The shield portion at the bottom end of the support pin has an area sufficient to cover over the sheet opening. Moreover, the support unit in a state where the top end of the support pin projects from the front surface of the chassis and the shield portion covers over the rear surface of the chassis is immobilized with respect to the chassis by the fixing portion.

This configuration allows the shield portion to stably cover over the sheet opening and further cover over part of the rear surface of the chassis, which is exposed from the sheet opening. Thus, for example, even in a case where a high-voltage-applied circuit or the like is positioned near the rear surface of the chassis, the occurrence of leakage between the circuit or the like and the chassis made of metal is prevented.

The support unit further includes an engaging body having a latch end that is hooked on an edge of the chassis opening, and in the engaging body, the latch end is at a position level with a midpoint between the top end and the bottom end of the support pin. Preferably, the latch end and the shield portion continuous with the bottom end of the support pin sandwich the chassis therebetween and thus constitute the fixing portion that immobilizes the support unit itself with respect to the chassis.

For example, the engaging body is deformed into such a shape as to be able to pass through the sheet opening and the chassis opening and then returns from the deformed shape into its original shape, and thus the latch end is displaced to be hooked on the edge of the chassis opening, so that the support unit is immobilized with respect to the chassis.

Furthermore, for example, in a case where the two openings that are the sheet opening and the chassis opening have a linear shape, the engaging body is continuous with the support pin and has such a linear shape as to be able to pass through the two openings. After being passed through the two openings, the engaging body is rotated around the support pin as an axis so as to intersect with the linear shapes of the two openings, and thus the latch end is hooked on the edge of the chassis opening, so that the support unit is immobilized with respect to the chassis.

Furthermore, for example, the sheet opening is formed by joining a first main portion that has an area sufficient for passage of the engaging body to a first auxiliary portion that does not allow passage therethrough of the engaging body but allows passage therethrough of a portion of the support pin, which extends from the midpoint to the bottom end of the support pin, and the chassis opening is formed by joining a second main portion that has an area sufficient for passage of the engaging body to a second auxiliary portion that does not allow passage therethrough of the engaging body but allows passage therethrough of the portion of the support pin, which extends from the midpoint to the bottom end of the support pin.

In the above-described case, after the engaging body is passed through the first main portion and the second main portion, the support pin is slid toward the first auxiliary portion and the second auxiliary portion, and thus the latch end of the engaging body is hooked on an edge of the second auxiliary portion, so that the support unit is immobilized with respect to the chassis.

Furthermore, preferably, for example, an external thread is formed on an outer circumference of the support pin, while an internal thread to be engaged with the external thread is formed on an inner circumference of the chassis opening, and the external thread and the internal thread are engaged with each other and thus constitute the fixing portion that immobilizes the support unit itself with respect to the chassis.

Preferably, in the support unit configured as above, the shield portion includes a first surface that is in contact with the bottom end of the support pin and a second surface that is a rear side of the first surface, and the second surface includes a protruding portion that protrudes from the second surface.

According to this configuration, a separate member (for example, a board on which a high-voltage-applied circuit or the like is mounted) that otherwise would be brought close to the rear surface of the chassis can be placed away from the rear surface by the length of the protruding portion. This further prevents the occurrence of leakage between the circuit or the like and the chassis made of metal.

A backlight unit including the support unit configured as above and an optical sheet that is supported by the top end of the support pin of the support unit is also encompassed within the scope of the present invention. Furthermore, a display device including the backlight unit and a display panel that receives light from the backlight unit is also encompassed within the scope of the present invention (the display panel may be a liquid crystal panel formed of a pair of substrates between which liquid crystal is sealed). Furthermore, a television receiver including the above-described display device is also encompassed within the scope of the present invention.

Advantageous Effects of the Invention

According to the present invention, even in a case where an opening for fitting a support unit thereinto is formed through each of a metallic chassis and an insulation sheet covering a rear surface of the chassis, a shield portion of the support unit covers the sheet opening and thus can cover over part of the chassis, which is exposed from the sheet opening. Thus, even in a case where, for example, a high-voltage-applied circuit faces the sheet opening, the occurrence of leakage is prevented.

DESCRIPTION OF EMBODIMENTS

Embodiment 1

The following describes one embodiment with reference to the appended drawings. In some of the drawings, hatching, reference signs of members, and the like may be omitted for the sake of convenience, in which case reference should be made to the other drawings.

Figure 11:
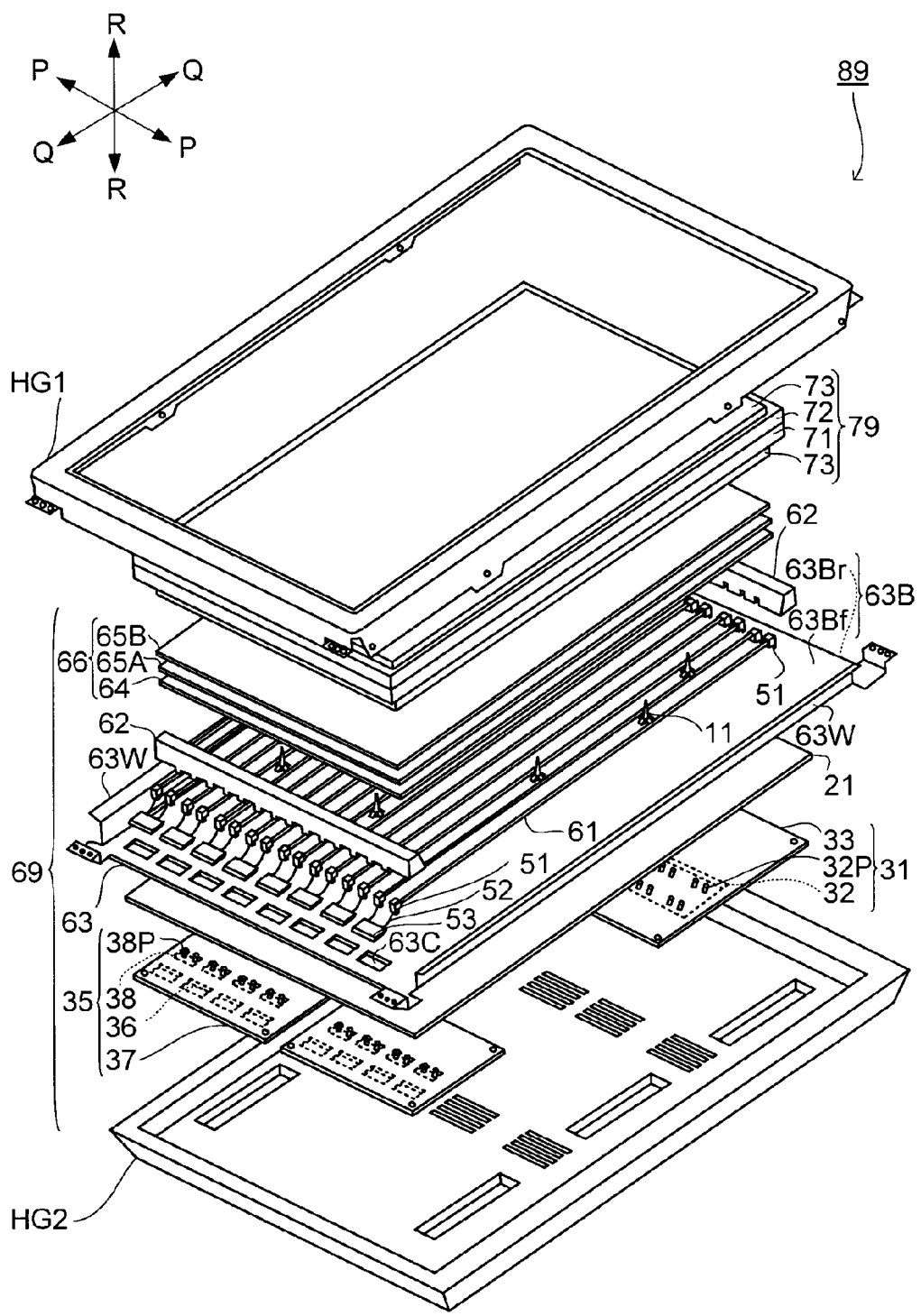
FIG. 11 is an exploded perspective view of the liquid crystal display device.

FIG. 11 is an exploded perspective view of a liquid crystal display device (display device) 89. As shown in this figure, the liquid crystal display device 89 includes a liquid crystal display panel 79, a backlight unit 69, and a housing HG (front housing HG1•rear housing HG2) that houses the liquid crystal display panel 79 and the backlight unit 69.

The liquid crystal display panel 79 is formed by laminating an active matrix substrate 71 including a switching element such as a TFT (thin film transistor) to an opposed substrate 72 opposed to the active matrix substrate 71 by use of a sealing material (not shown). Further, liquid crystal (not shown) is injected into the clearance between these substrates 71•72 (polarization films 73•73 are attached so as to sandwich the active matrix substrate 71 and the opposed substrate 72 therebetween).

Being a non-light-emitting type display panel, the liquid crystal display panel 79 receives light (backlight light) from the backlight unit 69 and thereby fulfills a display function. Thus, allowing the entire surface of the liquid crystal display panel 79 to be irradiated uniformly with light from the backlight unit 69 improves display quality of the liquid crystal display panel 79.

The backlight unit 69 includes a fluorescent tube (light source, linear light source) 61, a lamp holder 62, a backlight chassis (chassis) 63, a diffusion sheet 64, and lens sheets 65 (65A•65B).

The fluorescent tube 61 has a linear shape (rod shape, circular columnar shape, or the like), and a plurality of the fluorescent tubes 61 are mounted in the backlight unit 69 (for the sake of convenience, only some of the fluorescent tubes 61 are shown in the figure). An electrode (not shown) of the fluorescent tube 61 is held by a socket 51, and a harness 52 for receiving electric current supply extends out from the socket 51.

Figure 12:
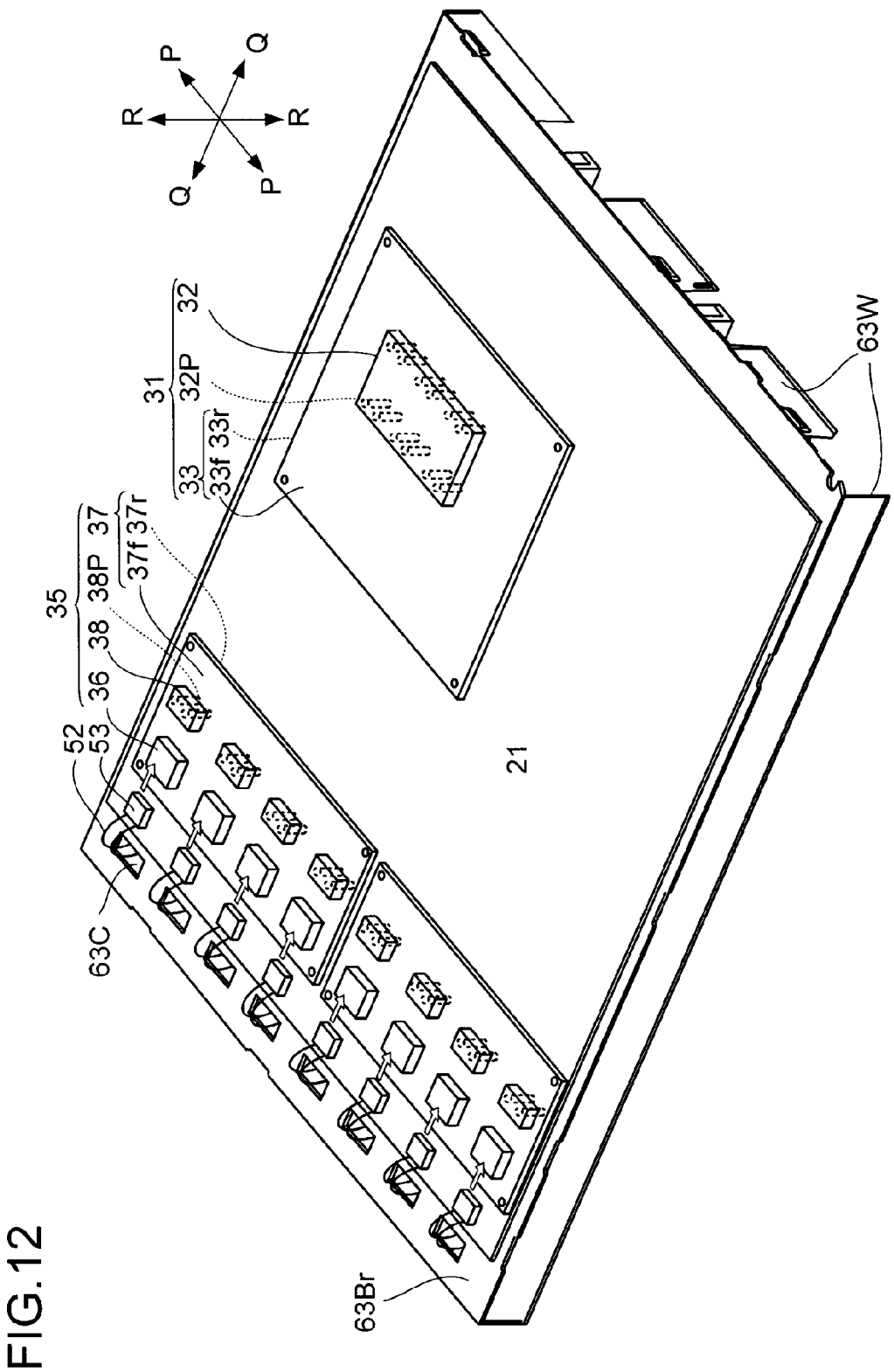
FIG. 12 is a perspective view showing various members positioned on a rear surface of the backlight chassis.

Moreover, a harness connection connector 53 connected to the fluorescent tubes 61 via two harnesses 52 and two sockets 51 acts as an electrical connection portion with respect to every two fluorescent tubes 61. As shown in FIG. 12 described later, the harness connection connector 53 is routed from a front surface 63Bf to a rear surface 63Br of the backlight chassis 63 via an aperture 63C for a connector, which is formed through the backlight chassis 63.

The lamp holder 62 is a block-shaped member used in a pair to hold the fluorescent tube 61. To be more specific, one of the pair of the lamp holders 62 supports one of both ends of the fluorescent tube 61 and the other of the pair of the lamp holders 62 supports the other of the ends of the fluorescent tube 61 so that the fluorescent tube 61 is mounted in the backlight unit 69.

The type of the fluorescent tube 61 is not limited, and the fluorescent tube 61 may be, for example, a cold-cathode tube or a hot-cathode tube. Furthermore, in the following description, a direction in which the fluorescent tubes 61 are arranged in parallel (direction in which the fluorescent tubes 61 are arranged in line) is indicated as a P direction, a direction in which the fluorescent tubes 61 extend is indicated as a Q direction, and a direction perpendicular to both of the P direction and the Q direction is indicated as an R direction.

The backlight chassis 63 is a box-shaped housing body including a bottom portion 63B and a wall portion 63W standing up from the bottom portion 63B. The backlight chassis 63 houses various members including the fluorescent tube 61 and the like (the fluorescent tubes 61 are laid so as to cover the bottom portion 63B of the backlight chassis 63; one surface of the bottom portion 63B, which faces the fluorescent tubes 61, is referred to as the front surface 63Bf, and a rear side of the front surface 63Bf is referred to as the rear surface 63Br).

Furthermore, the backlight chassis 63 is made of a metal having a reflection function. The front surface 63Bf of the bottom portion 63B of the backlight chassis 63 therefore reflects light of the fluorescent tubes 61. To be more specific, the bottom portion 63B reflects part of radiant light emitted from the fluorescent tubes 61 (radiant light emitted around each of the fluorescent tubes 61) and guides it to the diffusion sheet 64.

In a case where, however, the backlight chassis 63 is made of a material without a reflection function, a reflection sheet may be provided so as to cover the front surface 63Bf of the bottom portion 63B in order to reflect light of the fluorescent tubes 61 and guide it to the diffusion sheet 64.

In the backlight chassis 63, part of the rear surface 63Br of the bottom portion 63B is made to protrude and thus forms a boss (not shown). A screw (not shown) is screwed into the boss while interposing between itself and the backlight chassis 63, a power source board 33 and an inverter board 37 that are described later, and thus the power source board 33 and the inverter board 37 are mounted to the backlight chassis 63.

The diffusion sheet 64 is positioned so as to cover the florescent tubes 61 arranged in parallel (and accordingly, the front surface 63Bf of the backlight chassis 63) and diffuses light from the fluorescent tubes 61 so that the light is spread over the entire region of the liquid crystal display panel 79. The diffusion sheet 64 and the lens sheets 65A•65B are optical sheets that refract light as it travels and thus are referred to also as an optical sheet group 66. Furthermore, a support unit 11 (only some of the support units 11 are shown in the figure), which is a member that supports the optical sheet group 66, is described later.

The lens sheet 65A is an optical sheet that has, for example, a prism shape in the plane thereof and narrows the directivity of light, and is positioned so as to cover the diffusion sheet 64. The lens sheet 65A therefore condenses light traveling from the diffusion sheet 64, and thus improved luminance is obtained.

The lens sheet 65B is positioned so as to cover the lens sheet 65A, and is an optical sheet that transmits therethrough a polarized light component polarized in one direction and reflects a polarized light component polarized orthogonally to the polarized light component that is transmitted. The lens sheet 65B also reflects a polarized light component absorbed by the polarization film 73 thereby to reuse it, and thus luminance on the liquid crystal display panel 79 is improved.

In the backlight unit 69 configured as above, light from the fluorescent tubes 61 arranged in parallel reaches the diffusion sheet 64 directly or after being reflected by the bottom portion 63B of the backlight chassis 63. The light that has reached the diffusion sheet 64 further passes through the lens sheets 65A•65B while being diffused and thus is emitted as backlight light having increased light emission luminance. The backlight light then reaches the liquid crystal display panel 79, and thus the liquid crystal display panel 79 displays an image.

The front housing HG1 and the rear housing HG2 constituting the housing HG sandwich therebetween, the backlight unit 69 and the liquid crystal display panel 79 covering the backlight unit 69, which are configured as above, and thus fix them (there is no particular limitation on how they are fixed). That is, the front housing HG1, together with the rear housing HG2, sandwiches the backlight unit 69 and the liquid crystal display panel 79, and thus the liquid crystal display device 89 is completed.

Figure 13:
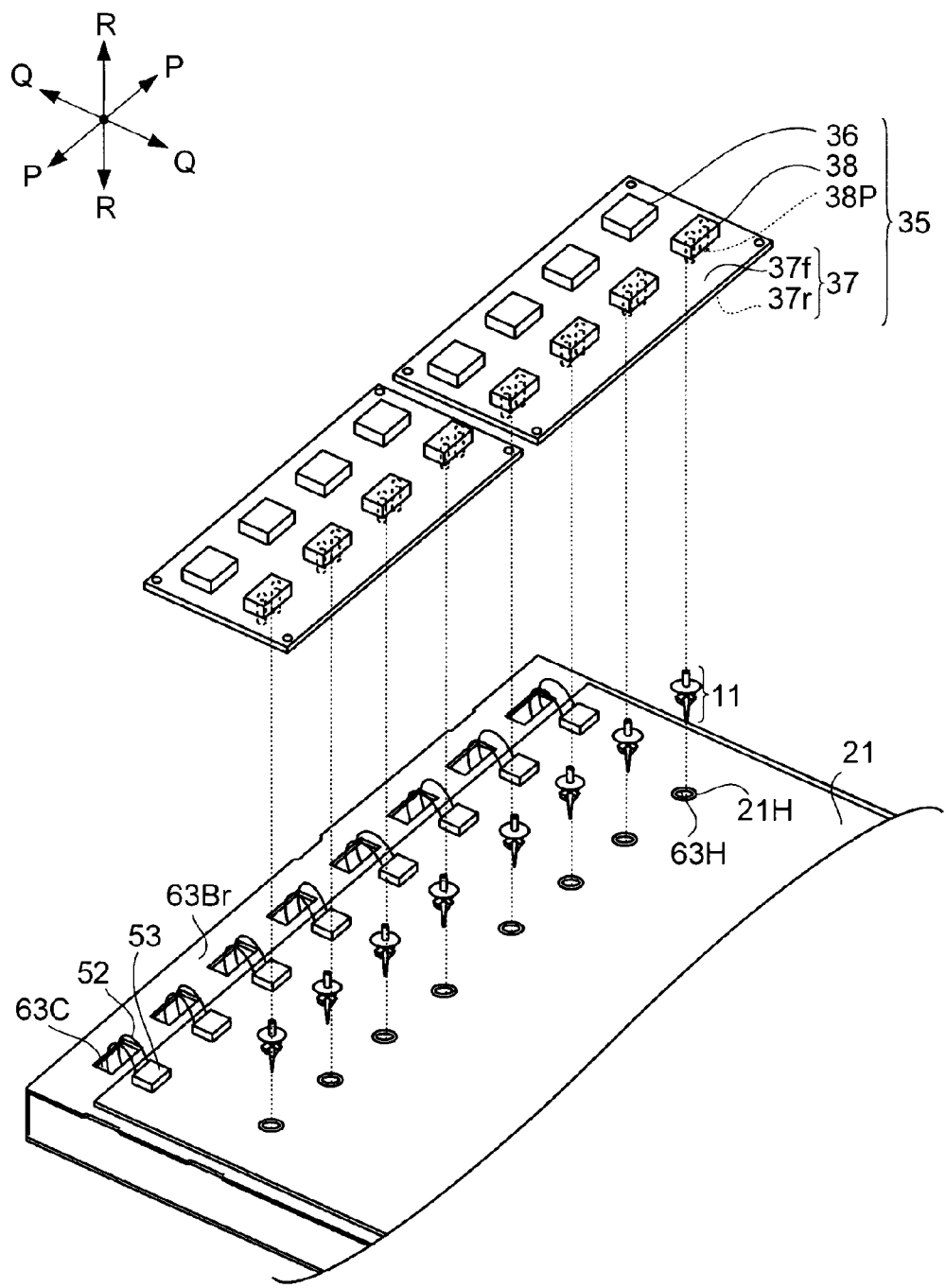
FIG. 13 is an exploded perspective view in which an inverter board shown in FIG. 12 is shown to be separated from the backlight chassis so that the support unit can be viewed.
Figure 14:
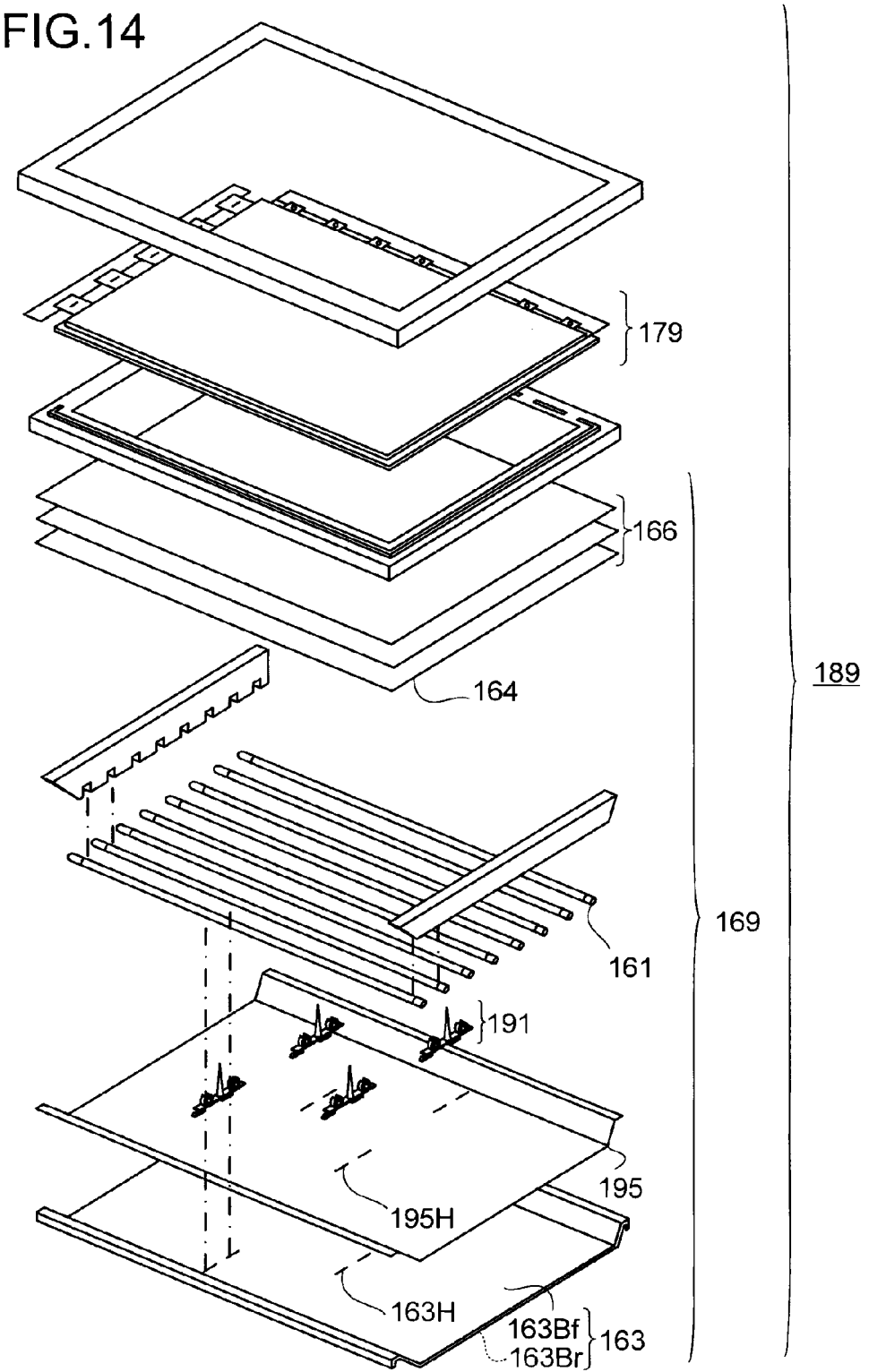
FIG. 14 is an exploded perspective view of a conventional liquid crystal display device.
Figure 15:
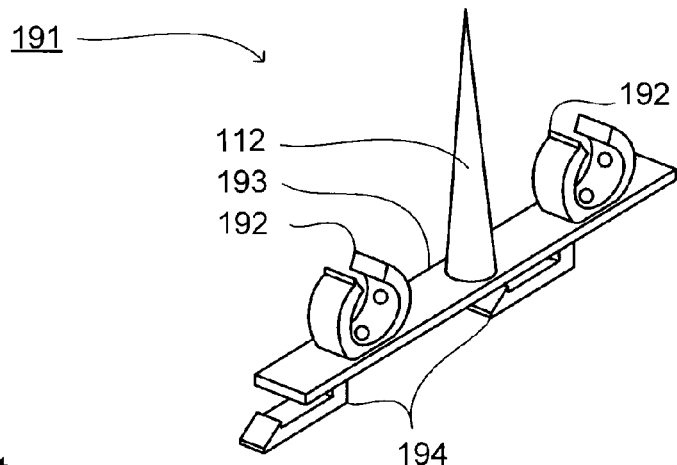
FIG. 15 is a perspective view of a lamp clip mounted in the conventional liquid crystal display device.
Figure 16:
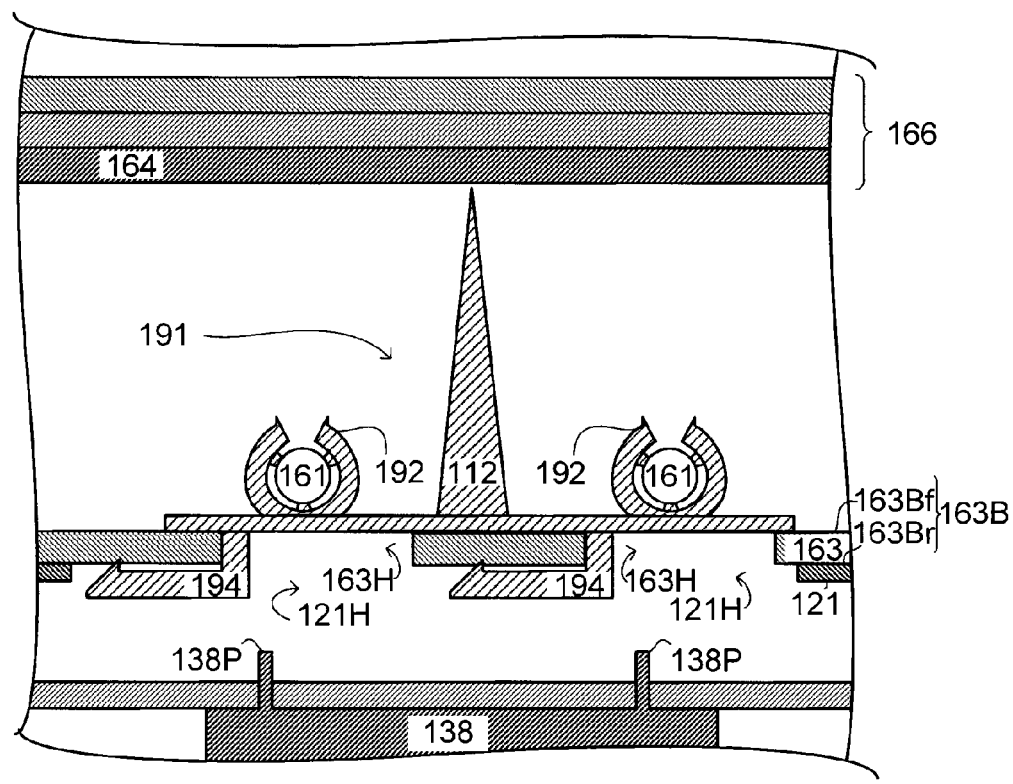
FIG. 16 is a cross-sectional view of the conventional liquid crystal display device in which the lamp clip shown in FIG. 15 is mounted to a backlight chassis.

Referring to FIG. 11 along with FIGS. 12 and 13, the following describes in detail various members positioned on the rear surface 63Br of the backlight chassis 63. FIG. 12 is a perspective view showing the various members positioned on the rear surface 63Br of the backlight chassis 63, and FIG. 13 is an exploded perspective view in which the various members shown in FIG. 12 are shown to be arranged differently from FIG. 12.

On the rear surface 63Br of the backlight chassis 63, for example, a power source unit 31, an inverter unit 35, an insulation sheet 21, and the support unit 11 are positioned (for the support unit 11, see FIG. 13).

The power source unit 31 includes a power source circuit 32 that supplies an electric current to various circuits and the like in the liquid crystal display device 89 and the power source board 33 on which the power source circuit 32 is mounted (a board surface on which the power source circuit 32 is mounted is referred to as a front board surface 33f).

The power source board 33 is fastened to the backlight chassis 63 with the screw (not shown), and a rear board surface 33r thereof that is a rear side of the front board surface 33f faces the rear surface 63Br of the backlight chassis 63. Furthermore, a metal terminal 32P of the power source circuit 32 is exposed onto the rear board surface 33r of the power source board 33.

The inverter unit 35 includes an inverter circuit, an on-board connector 36, and the inverter board 37 that is a board on which various circuits such as the inverter circuit, the on-board connector 36, and the like are mounted (a board surface of the inverter board 37, on which the inverter circuit and the on-board connector 36 are mounted, is referred to as a front board surface 37f, and a board surface thereof that is a rear side of the front board surface 37f is referred to as a rear board surface 37r).

The inverter circuit is composed of various circuits such as a booster circuit (inverter transformer) 38 and is a circuit used to drive the fluorescent tube 61 (for the sake of convenience, FIGS. 12 and 13 mainly show the inverter transformer 38 in the inverter circuit).

The on-board connector 36 is installed on the front board surface 37f of the inverter board 37, on which the inverter transformer 38 is also mounted, and is connected to the inverter circuit via unshown board wiring (wiring disposed on the inverter board 37). That is, the on-board connector 36 is an electrical connection portion with respect to the inverter circuit.

The on-board connector 36 is mated with the harness connection connector 53 to which two harnesses 52 each extending out from the socket 51 are connected, and thus an alternating current is supplied to the fluorescent tube 61. That is, an electrical connection between the inverter circuit and the fluorescent tube 61 is established through the mating between the on-board connector 36 installed on the inverter board 37 and the harness connection connector 53 to which two harnesses 52 each extending out from the socket 51 are connected.

To be more specific, as shown by a hollow arrow in FIG. 12, the harness connection connector 53 positioned on the side of the rear surface 63Br of the backlight chassis 63 is moved toward the on-board connector 36 on the inverter board 37 and is mated therewith. Thus, an alternating current from the inverter circuit flows to the fluorescent tube 61 via the board wiring (not shown), the on-board connector 36, the harness connection connector 53, the harness 52, and the socket 51. As a result, the fluorescent tube 61 is driven using the alternating current.

The inverter board 37 on which the inverter circuit and the on-board connector 36 are mounted is fastened to the backlight chassis 63 with the screw (not shown), and the rear board surface 37r that is the rear side of the front board surface 37f faces the rear surface 63Br of the backlight chassis 63. Furthermore, a metal terminal 38P of the inverter transformer 38 is exposed onto the rear board surface 37r of the inverter board 37.

That is, the metal terminal 38P of the inverter transformer 38 is brought close to the rear surface 63Br of the backlight chassis 63. Similarly, the metal terminal 32P of the power source circuit 32 is also brought close to the rear surface 63Br of the backlight chassis 63.

Each of the above-described metal terminals 32P•38P constitutes part of a component to which a relatively high voltage is applied (power source circuit 32•inverter transformer 38). The metal terminals 32P•38P brought close to the rear surface 63Br of the backlight chassis 63 made of metal, therefore, leads to the occurrence of leakage and thus is problematic. As a solution to this, the insulation sheet 21 is attached to the rear surface 63Br of the backlight chassis 63. That is, the insulation sheet 21 is a sheet that prevents the entry of an electric current that otherwise would flow into the backlight chassis 63.

The support unit 11 comes in contact with the diffusion sheet 64 and thereby supports not only the diffusion sheet 64 but also the lens sheets 65A•65B layered on the diffusion sheet 64. As shown in FIG. 13, the support unit 11 is fitted into a sheet opening (opening) 21H formed through the insulation sheet 21 and a chassis opening (opening) 63H formed through the bottom portion 63B of the backlight chassis 63 and thus is mounted to the backlight chassis 63.

With regard to the sheet opening 21H and the chassis opening 63H that are formed for mounting the support unit 11, the sheet opening 21H is set to have an area larger than that of the chassis opening 63H in order to prevent the insulation sheet 21 from overlapping an opening region of the chassis opening 63H.

Figure 1:
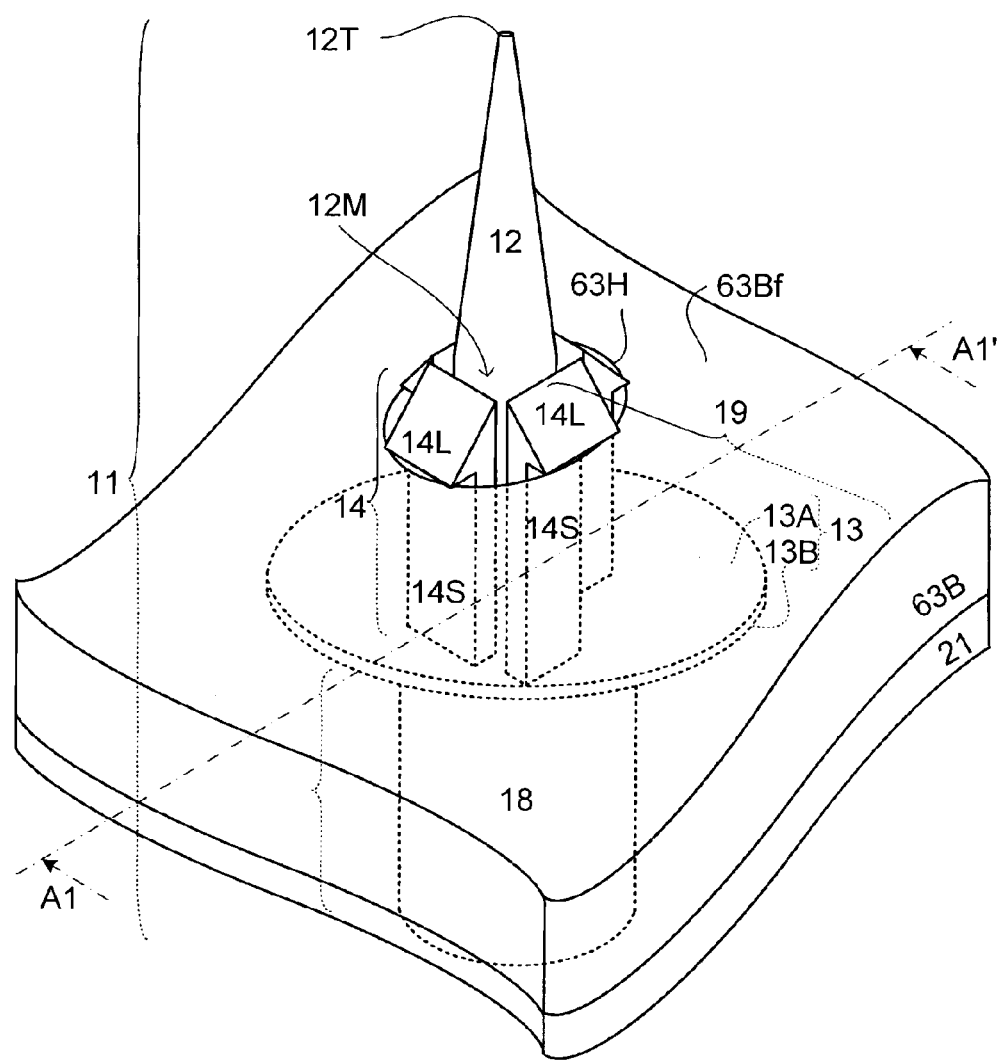
FIG. 1 is a perspective view showing a support unit, a backlight chassis, and an insulation sheet in Embodiment 1.
Figure 2:
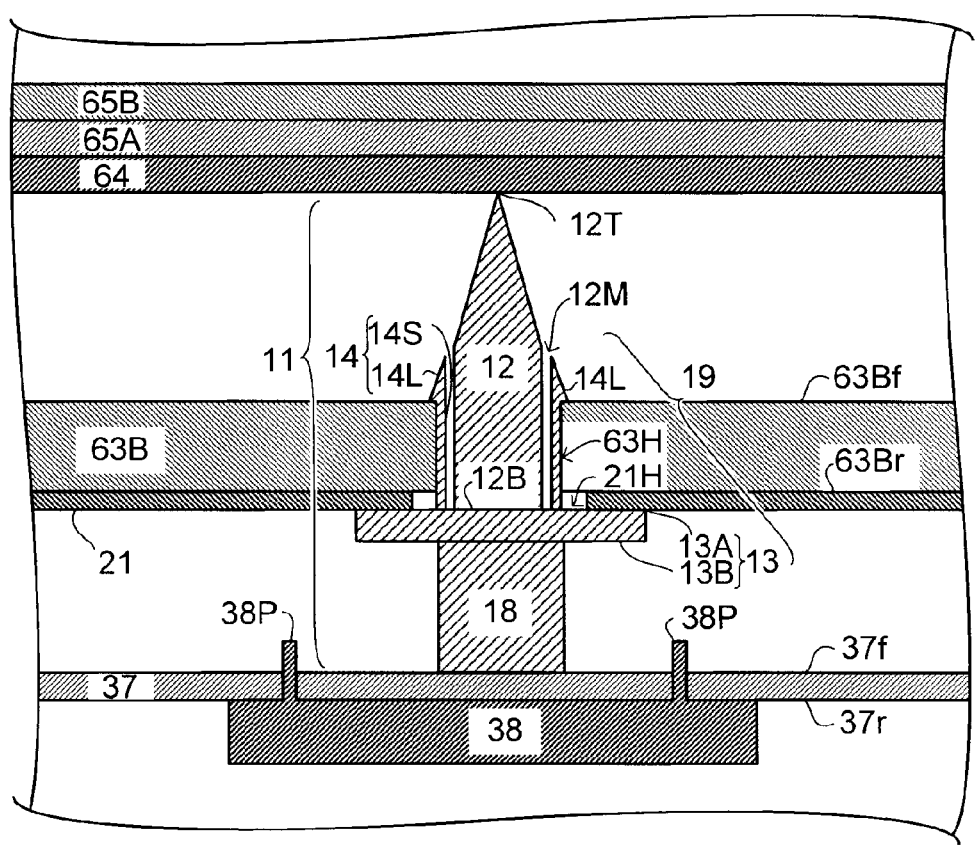
FIG. 2 is a cross-sectional view showing a liquid crystal display device in Embodiment 1 (in a cross section taken in the direction of arrows along a line A1-A1' in FIG. 1).

Referring to FIGS. 1 and 2 as well as FIGS. 11 to 13, the following describes the support unit 11 in detail. FIG. 1 is a perspective view showing the support unit 11, the bottom portion 63B of the backlight chassis 63, and the insulation sheet 21. FIG. 2 is a cross-sectional view showing the liquid crystal display device 89 (in a cross section taken in the direction of arrows along a line A1-A1' in FIG. 1).

The support unit 11 is made of an insulating material and includes a support pin 12, a shield portion 13, a hook body (engaging body) 14, and a protruding portion 18.

The support pin 12 is a shaft-shaped pin including a tapered top end 12T that comes in contact with the diffusion sheet 64. The support pin 12 has an outer circumferential area around a pin axis thereof (namely, a cross-sectional area perpendicular to a pin axis direction of the support pin 12), which is smaller than an opening area of the sheet opening 21H and an opening area of the chassis opening 63H. The support pin 12 is therefore configured so that, as shown in FIG. 2, the top end 12T thereof can be passed through the sheet opening 21H and the chassis opening 63H, which overlap each other, to come in contact with the diffusion sheet 64.

The shield portion 13 is in the form of a disk (circular plate member) and is continuous with a bottom end 12B of the support pin 12 while intersecting with (for example, while being perpendicular to) the pin axis direction of the support pin 12. The shield portion 13 has an area even larger than the opening area of the sheet opening 21H, which is larger than the opening area of the chassis opening 63H. Thus, when the top end 12T of the support pin 12 is passed through the sheet opening 21H and further through the chassis opening 63H, the shield portion 13 positioned at the bottom end 12B of the support pin 12 covers over the sheet opening 21H.

As for the hook body 14, a plurality of the hook bodies 14 are provided so as to surround the support pin 12. Each of the hook bodies 14 extends out from the shield portion 13 so as to be positioned adjacently to the support pin 12 to its tip at which it includes a latch end 14L. To be more specific, the hook body 14 includes the latch end 14L and a support piece 14S that supports the latch end 14L.

The support piece 14S is an elastic member extending out from the shield portion 13 and has a length somewhat longer than a length as the sum of the thickness of the bottom portion 63B of the backlight chassis 63 and the thickness of the insulation sheet 21 and a shape that fits within a gap between the chassis opening 63H and the support pin 12. Thus, when the shield portion 13 is covering over the sheet opening 21H, as a result of the support piece 14S being passed through the sheet opening 21H and the chassis opening 63H, the tip of the support piece 14S is exposed from the chassis opening 63H onto the front surface 63Bf of the bottom portion 63B.

The latch end 14L is positioned at the tip of the support piece 14S and has a shape that fits within the gap between the chassis opening 63H and the support pin 12. The shape of the latch end 14L, however, is also such that the latch end 14L extends out so as to be away from the support pin 12 by an increasing distance as it reaches an edge of the chassis opening 63H on the front surface 63Bf of the bottom portion 63B (that is, in the hook body 14, the latch end 14L to be hooked on the edge of the chassis opening 63H is at a position level with a midpoint 12M between the top end 12T and the bottom end 12M of the support pin 12).

Thus, when the latch end 14L, together with the support piece 14S, is made to enter the gap between the chassis opening 63H and the support pin 12, the latch end 14L is pressed against the inner wall of the chassis opening 63H. At this time, under the pressing force, the support piece 14S is bent to such an extent that the latch end 14L fits within the gap between the chassis opening 63H and the support pin 12.

After the latch end 14L has been passed through the chassis opening 63H, the support piece 14S that has been bent returns into its original shape. The latch end 14L thus is hooked on the edge of the chassis opening 63H on the front surface 63Bf of the bottom portion 63B. The bottom line is that the hook body 14 is deformed into such a shape as to be able to pass through the sheet opening 21H and the chassis opening 63H and then returns from the deformed shape into its original shape, and thus the latch end 14L is displaced to be hooked on the edge of the chassis opening 63H.

When the latch end 14L is hooked on the edge of the chassis opening 63H in this manner, the latch end 14L (and accordingly, the hook body 14), together with the shield portion 13, sandwiches the backlight chassis 63. As a result, the support unit 11 is immobilized with respect to the backlight chassis 63 [it can be said that the latch end 14L (and accordingly, the hook body 14) and the shield portion 13 constitute a fixing portion 19 that immobilizes the support unit 11 with respect to the backlight chassis 63].

Furthermore, when the support pin 12 is immobilized with respect to the backlight chassis 63, the shield portion 13 securely covers the sheet opening 21H. In this case, the chassis opening 63H that has an area smaller than the opening area of the sheet opening 21H and overlaps the sheet opening 21H is also covered securely by the shield portion 13.

Thus, an edge region of the chassis opening 63H defined by an edge of the chassis opening 63H and the vicinity thereof (part of the bottom portion 63B), which is exposed from the sheet opening 21H, is not directly brought close to the metal terminal 32P of the power source circuit 32 and the metal terminal 38P of the inverter transformer 38. As a result, an electric current does not flow from the metal terminals 32P•38P to the edge region of the chassis opening 63H, and thus the occurrence of leakage is prevented.

Based on the above, the backlight unit 69 includes the support unit 11 that supports the diffusion sheet 64 so that the diffusion sheet 64 is placed away from the front surface 63Bf of the backlight chassis 63. Further, the support unit 11 includes the support pin 12 that is passed through the sheet opening 21H and the chassis opening 63H, which overlap each other, to come in contact with the diffusion sheet 64 and further includes the shield portion 13 that covers over the sheet opening 21H.

The support unit 11 also includes a member that immobilizes the support unit 11 itself with respect to the backlight chassis 63, such as, for example, the hook body 14 and the shield portion 13. To be more specific, the support unit 11 sandwiches the backlight chassis 63 between the latch end 14L of the hook body 14 and the shield portion 13 continuous with the bottom end 12B of the support pin 12 so as to immobilize (fix) itself with respect to the backlight chassis 63.

According to this configuration, using the support pin 12, the support unit 11 places the diffusion sheet 64 away from the front surface 63Br of the backlight chassis 63 (and accordingly, the fluorescent tube 61). This prevents the diffusion sheet 64 from coming in contact with the fluorescent tube 61 and from being bent excessively.

Moreover, the edge region of the chassis opening 63H that fits within an opening region of the sheet opening 21H formed for mounting the support unit 11 (namely, part of the backlight chassis 63, which is exposed from the sheet opening 21H) is covered by the shield portion 13. Thus, even in a case where the metal terminal 32P of the power source circuit 32, the metal terminal 38P of the inverter transformer 38, and the like are present near the edge region of the chassis opening 63H, the occurrence of leakage is prevented reliably.

Furthermore, the support unit 11 configured as above further includes the protruding portion 18. With respect to a first surface 13A of the shield portion 13, which is in contact with the bottom end 12B of the support pin 12, the protruding portion 18 is formed on a second surface 13B that is a rear side of the first surface 13A. That is, the protruding portion 18 is a member protruding from the second surface 13B.

The protruding portion 18 places the shield portion 13 (and accordingly, the vicinity of the sheet opening 21H, which is covered by the shield portion 13) away from the metal terminals 32P•38P by a distance defined by its own length. This further ensures that the edge region of the chassis opening 63H is not brought close to the metal terminals 32P•38P, and thus the occurrence of leakage is prevented reliably.

Furthermore, even if the power source board 33 and the inverter board 37 are bent, a fixed distance or a distance longer than that is secured between these substrates 33•37 and the backlight chassis 63. This even further ensures that the edge region of the chassis opening 63H is not brought close to the metal terminals 32P•38P, and thus the occurrence of leakage is prevented reliably.

In the foregoing description, the hook body 14 projects from the first surface 13A of the shield portion 13, but the configuration thereof is not limited thereto. For example, the hook body 14 may be continuous with the outer circumference of the support pin 12. The bottom line is that it is only required that, using the latch end 14L, the hook body 14 press down the edge of the chassis opening 63H so that the latch end 14L and the shield portion 13 can sandwich the backlight chassis 63 therebetween, and there is no particular limitation on the position and shape of the hook body 14.

Embodiment 2

Figure 3:
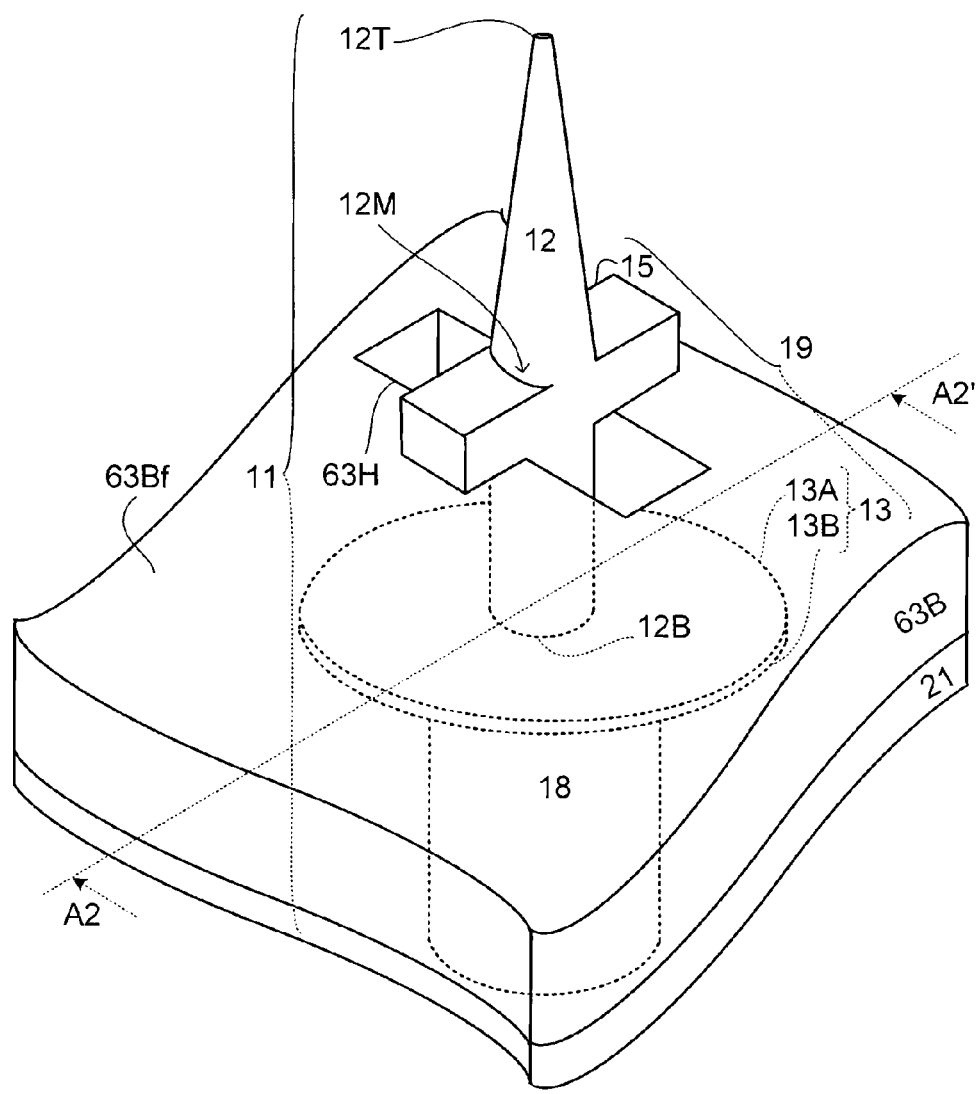
FIG. 3 is a perspective view showing a support unit, a backlight chassis, and an insulation sheet in Embodiment 2.
Figure 4:
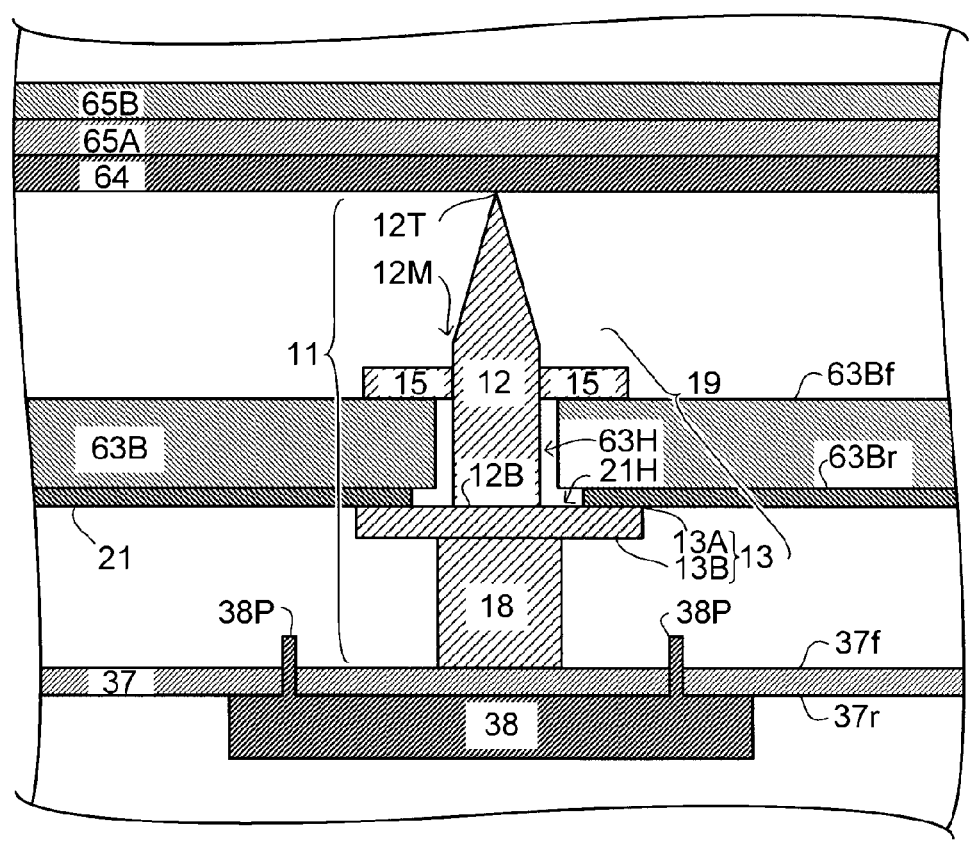
FIG. 4 is a cross-sectional view showing a liquid crystal display device in Embodiment 2 (in a cross section taken in the direction of arrows along a line A2-A2' in FIG. 3).

The description is directed to Embodiment 2. In the following description, the same reference signs are used to denote members having similar functions to the members used in Embodiment 1, and duplicate descriptions thereof are omitted. Referring to FIGS. 3 and 4, Embodiment 2 describes a backlight unit 69 having similar effects to those provided by Embodiment 1.

Similarly to FIG. 1, FIG. 3 is a perspective view showing a support unit 11, a bottom portion 63B of a backlight chassis 63, and an insulation sheet 21. FIG. 4 is a cross-sectional view showing a liquid crystal display device 89 (in a cross section taken in the direction of arrows along a line A2-A2' in FIG. 3).

The support unit 11 in Embodiment 2 includes, similarly to Embodiment 1, a support pin 12, a shield portion 13, and a protruding portion 18 and newly includes an intersecting body (engaging body, latch end) 15.

The intersecting body 15 extends out at a midpoint 12M between a top end 12T and a bottom end 12B of the support pin 12 so as to intersect with a pin axis direction of the support pin 12. For example, the intersecting body 15 extends orthogonally to the pin axis direction of the support pin 12 so as to form a linear shape. (The length from the intersecting body 15 to the shield portion 13 is somewhat longer than a length as the sum of the thickness of the bottom portion 63B of the backlight chassis 63 and the thickness of the insulation sheet 21.)

A sheet opening 21H of the insulation sheet 21 and a chassis opening 63H of the backlight chassis 63 are also formed in a linear shape so as to conform to the linear intersecting body 15. In particular, each of the sheet opening 21H and the chassis opening 63H is set to have a linear shape larger than the linear shape of the intersecting body 15.

Thus, when the orientation of the linear intersecting body 15 coincides with the orientation of the two openings 21H•63H, in the process in which the support pin 12 is passed through the sheet opening 21H and further through the chassis opening 63H, the intersecting body 15 is also passed through the two openings 21H•63H. The intersecting body 15 thus reaches a front surface 63Bf of the backlight chassis 63.

Then, in a state where the intersecting body 15 is positioned on the front surface 63Bf of the backlight chassis 63, the support pin 12 is rotated around the pin axis direction so that the intersecting body 15 intersects with the two linear openings 21H•63H and thus is hooked on the front surface 63Bf of the backlight chassis 63 (for example, on an edge of the chassis opening 63H).

When hooked on the front surface 63Bf of the bottom portion 63B such as on the edge of the chassis opening 63H in this manner, the intersecting body 15, together with the shield portion 13, sandwiches the backlight chassis 63. As a result, the support unit 11 is immobilized with respect to the backlight chassis 63. It may therefore be said that the intersecting body 15 and the shield portion 13 constitute a fixing portion 19 that immobilizes the support unit 11 with respect to the backlight chassis 63 (since the intersecting body 15 substantially as a whole is hooked on the edge of the chassis opening 63H, it may be said that the intersecting body 15 constitutes a latch end).

When the support unit 11 is immobilized with respect to the backlight chassis 63, similarly to the case of the backlight unit 69 in Embodiment 1, the shield portion 13 securely covers the sheet opening 21H. In this case, the chassis opening 63H that has an area smaller than an opening area of the sheet opening 21H and overlaps the sheet opening 21H is also covered securely by the shield portion 13.

As a result, an edge region of the chassis opening 63H defined by an edge of the chassis opening 63H and the vicinity thereof, which is exposed from the sheet opening 21H, is not directly brought close to a metal terminal 32P of a power source circuit 32 and a metal terminal 38P of an inverter transformer 38, so that an electric current does not flow from the metal terminals 32P•38P to the edge region of the chassis opening 63H.

In order to maintain the state where the intersecting body 15 is hooked on the front surface 63Bf of the bottom portion 63B such as on the edge of the chassis opening 63H, a mechanism may be included that fixes the support pin 12 in this state so as to prevent it from being rotated.

Furthermore, in view of the possibility that the support pin 12 might be accidentally moved along the linear sheet opening 21H•chassis opening 63H, the shield portion 13 may be formed in a shape elongated in a direction intersecting with the extending direction of the intersecting body 15 (for example, in the same direction as the direction of the linear shapes of the sheet opening 21H•chassis opening 63H), such as, for example, an ellipsoidal shape.

Embodiment 3

Figure 5:
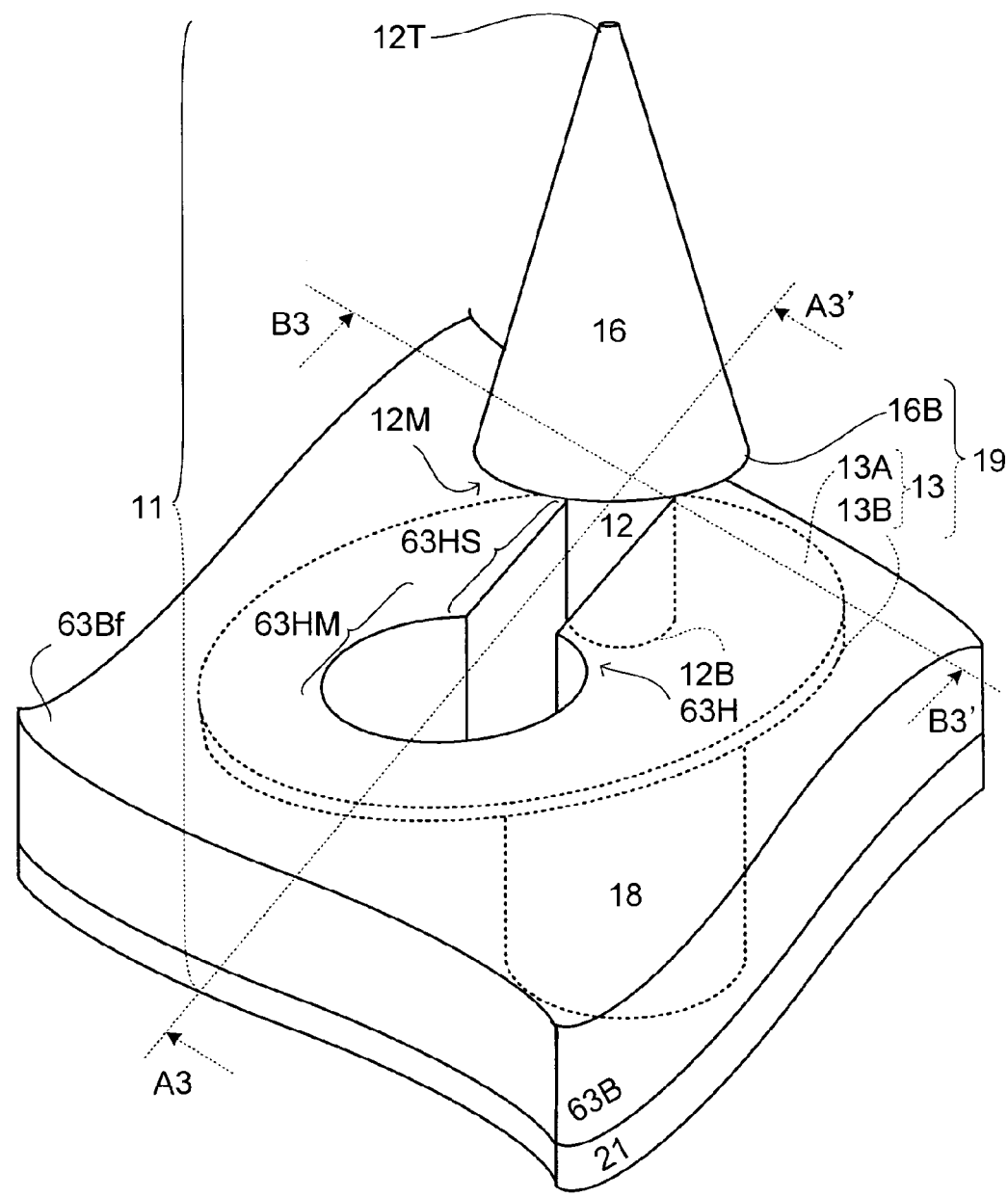
FIG. 5 is a perspective view showing a support unit, a backlight chassis, and an insulation sheet in Embodiment 3.
Figure 6:
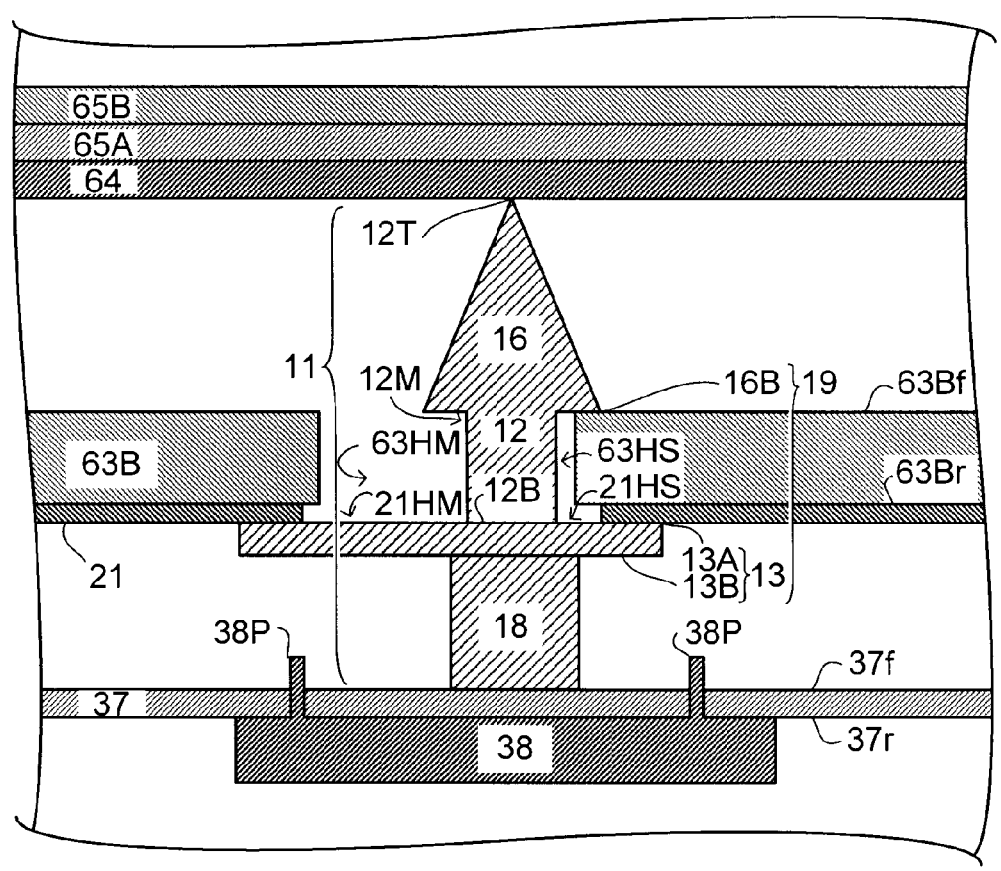
FIG. 6 is a cross-sectional view showing a liquid crystal display device in Embodiment 3 (in a cross section taken in the direction of arrows along a line A3-A3' in FIG. 5).
Figure 7:
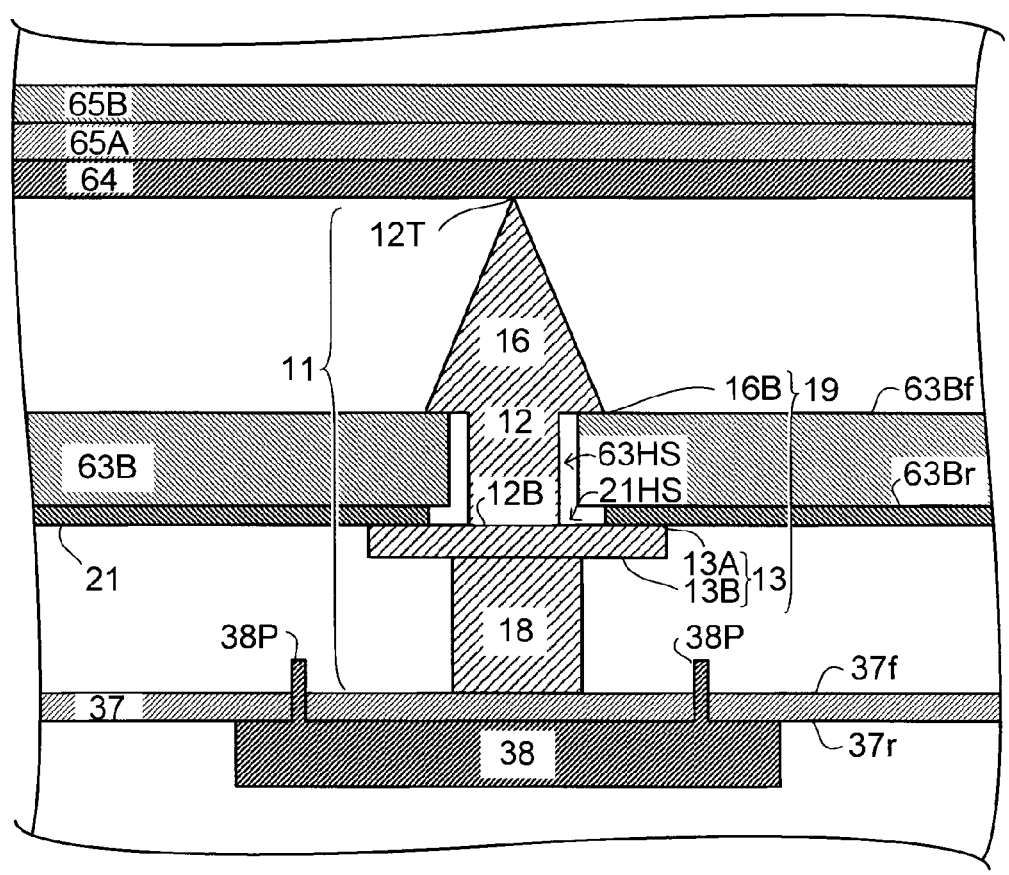
FIG. 7 is a cross-sectional view showing the liquid crystal display device in Embodiment 3 (in a cross section taken in the direction of arrows along a line B3-B3' in FIG. 5).

The description is directed to Embodiment 3. In the following description, the same reference signs are used to denote members having similar functions to the members used in Embodiments 1•2, and duplicate descriptions thereof are omitted. Referring to FIGS. 5 to 7, Embodiment 3 describes a backlight unit 69 having similar effects to those provided by Embodiments 1•2.

Similarly to FIG. 1, FIG. 5 is a perspective view showing a support unit 11, a bottom portion 63B of a backlight chassis 63, and an insulation sheet 21. FIGS. 6 and 7 are cross-sectional views showing a liquid crystal display device 89, where FIG. 6 shows a cross section taken in the direction of arrows along a line A3-A3' in FIG. 5, and FIG. 7 shows a cross section taken in the direction of arrows along a line B3-B3' in FIG. 5.

The support unit 11 in Embodiment 3 includes, similarly to Embodiments 1•2, a support pin 12, a shield portion, and a protruding portion 18 and newly includes an umbrella-shaped body (engaging body) 16.

The umbrella-shaped body 16 is a member formed of a portion of the support pin 12, which extends from a top end 12T to about a midpoint 12M of the support pin 12 and bulges from the outer circumference of the support pin 12 into an umbrella shape. A skirt portion (latch end) 16B of the umbrella-shaped body 16 therefore has an outer circumference larger than the outer circumference of the support pin 12. Furthermore, the length from the skirt portion 16B to the shield portion 13 is somewhat longer than a length as the sum of the thickness of the bottom portion 63B of the backlight chassis 63 and the thickness of the insulation sheet 21.

A sheet opening 21H of the insulation sheet 21 and a chassis opening 63H of the backlight chassis 63 are formed in such a shape as to be able to accommodate the outer circumference of the skirt portion 16B, such as, for example, a circular shape. In particular, each of the sheet opening 21H and the chassis opening 63H includes a circular portion larger than a circular shape defined by the outer circumference of the skirt portion 16B (the circular portion of the sheet opening 21H is referred to as a first circular portion 21HM, and the circular portion of the chassis opening 63H is referred to as a second circular portion 63HM).

Moreover, the sheet opening 21H includes a first linear extension portion (first auxiliary portion) 21HS continuous with the first circular portion (first main portion) 21HM, and the chassis opening 63H includes a second linear extension portion (second auxiliary portion) 63HS continuous with the second circular portion (second main portion) 63HM. To be more specific, each of the first linear extension portion 21HS and the second linear extension portion 63HS is a linear portion having a width insufficient for the passage of the umbrella-shaped body 16 (specifically, the skirt portion 16B) but sufficient for the passage of a portion of the support pin 12, which extends from the midpoint 12M to a bottom end 12B of the support pin 12.

The first circular portion 21HM of the sheet opening 21H has an area larger than the area of the second circular portion 63HM of the chassis opening 63H, and the first linear extension portion 21HS of the sheet opening 21H has an area larger than the area of the second linear extension portion 63HS of the chassis opening 63H (the area of the sheet opening 21H as a whole is also larger than the area of the chassis opening 63H as a whole).

Furthermore, the shield portion 13 is formed in such a shape as to be able to cover the sheet opening 21H, such as, for example, an ellipsoidal shape and is continuous with the support pin 12 not at the center of the ellipsoidal shape but at an end thereof in the vicinity of its major axis.

In order for the support pin 12, which carries the umbrella-shaped body 16, of the support unit 11 to be passed through the sheet opening 21H and the chassis opening 63H configured as above, the support pin 12 is aligned with the first circular portion 21HM and the second circular portion 63HM. When the top end 12T of the support pin 12 is made to enter the first circular portion 21HM and further enter the second circular portion 63HM, the umbrella-shaped body 16 formed around the outer circumference of the support pin 12 is passed through both the circular portions 21HM•63HM without being obstructed by the inner walls of the circular portions 21HM•63HM. Moreover, the shield portion 13 positioned at the bottom end 12B of the support pin 12 covers over the first circular portion 21HM.

Then, in a state where the skirt portion 16B of the umbrella-shaped body 16 is positioned on a front surface 63Bf of the backlight chassis 63, the support pin 12 is moved (slid) along the first linear extension portion 21HS and the second linear extension portion 63HS, so that the skirt portion 16B overlaps the second linear extension portion 63HS in the backlight chassis 63 and thus is hooked on the front surface 63Bf of the backlight chassis 63 (for example, on an edge of the second linear extension portion 63HS).

When the umbrella-shaped body 16 is hooked on the front surface 63Bf of the bottom portion 63B such as on the edge of the second linear extension portion 63HS in this manner, the skirt portion 16B of the umbrella-shaped body 16, together with the shield portion 13, sandwiches the backlight chassis 63, so that the support unit 11 is immobilized with respect to the backlight chassis 63. It can therefore be said that the skirt portion 16B and the shield portion 13 constitute a fixing portion 19 that immobilizes the support unit 11 with respect to the backlight chassis 63.

The support pin 12 is continuous with the ellipsoidal shield portion 13 not at the center of the shield portion 13 but at the end thereof in the vicinity of its major axis. Thus, even if the support pin 12 is slid along the first linear extension portion 21HS and the second linear extension portion 63HS and thus is placed away from the first circular portion 21HM and the second circular portion 63HM, similarly to the case of the backlight unit 69 in each of Embodiments 1•2, the shield portion 13 securely covers the sheet opening 21H. In this case, the chassis opening 63H that has an area smaller than an opening area of the sheet opening 21H and overlaps the sheet opening 21H is also covered securely by the shield portion 13.

As a result, an edge region of the chassis opening 63H defined by an edge of the chassis opening 63H and the vicinity thereof, which is exposed from the sheet opening 21H, is not directly brought close to a metal terminal 32P of a power source circuit 32 and a metal terminal 38P of an inverter transformer 38, so that an electric current does not flow from the metal terminals 32P•38P to the edge region of the chassis opening 63H.

The outer circumferential shape of the support pin 12 is not particularly limited. It is, however, preferable that the outer circumferential shape of the support pin 12 is such a shape as to allow close contact with opposed inner walls in the second linear extension portion 63HS of the chassis opening 63H (for example, a quadrangular shape) since this makes it unlikely that the support pin 12 is displaced in the second linear extension portion 63HS (for example, it becomes unlikely that, in the second linear extension portion 63HS, the support pin 12 is rotated or slid backward to the second circular portion 63HM).

Figure 8:
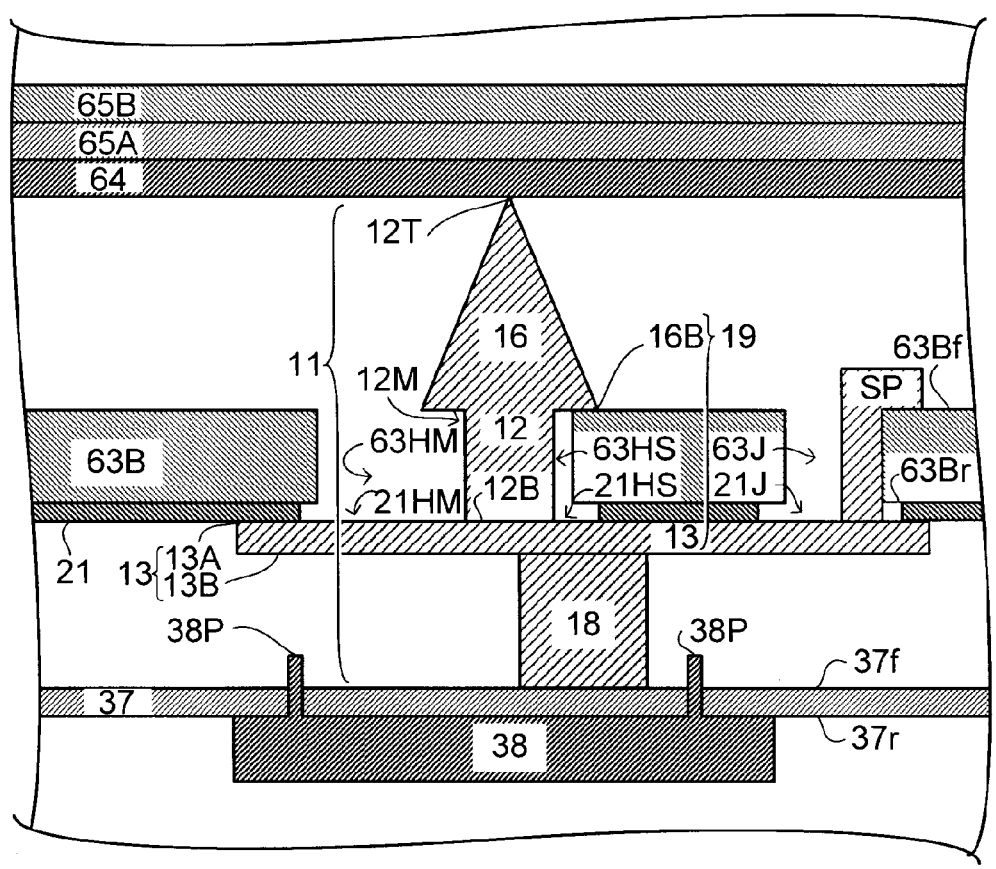
FIG. 8 is a cross-sectional view showing another example of the liquid crystal display device shown in FIG. 6.

Furthermore, as shown in FIG. 8 illustrating another example of the configuration shown in FIG. 6, a configuration is also possible in which openings 21J•63J different from the sheet opening 21H and the chassis opening 63H are formed through the insulation sheet 21 and through the backlight chassis 63, respectively, and a stopper SP that is fitted into the openings 21J•63J projects from a first surface 13A of the shield portion 13. This configuration prevents the support pin 12 from being rotated in the second linear extension portion 63HS.

The opening 21J has an opening area larger than an opening area of the opening 63J. With respect thereto, the shield portion 13 has an area sufficient even to cover over the opening 21J in addition to the sheet opening 21H. This prevents leakage from occurring due to the openings 21J•63H.

Embodiment 4

Figure 9:
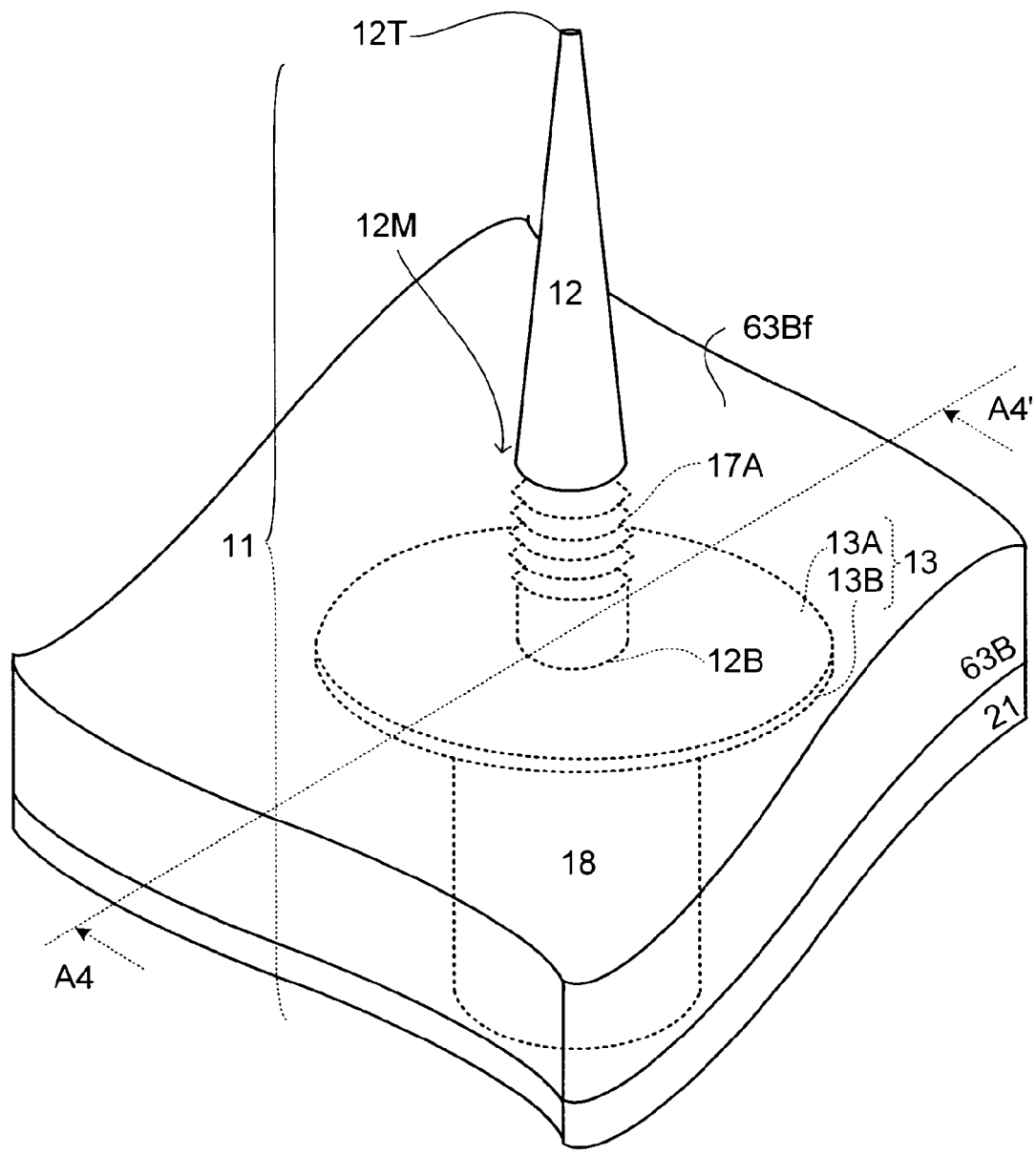
FIG. 9 is a perspective view showing a support unit, a backlight chassis, and an insulation sheet in Embodiment 4.
Figure 10:
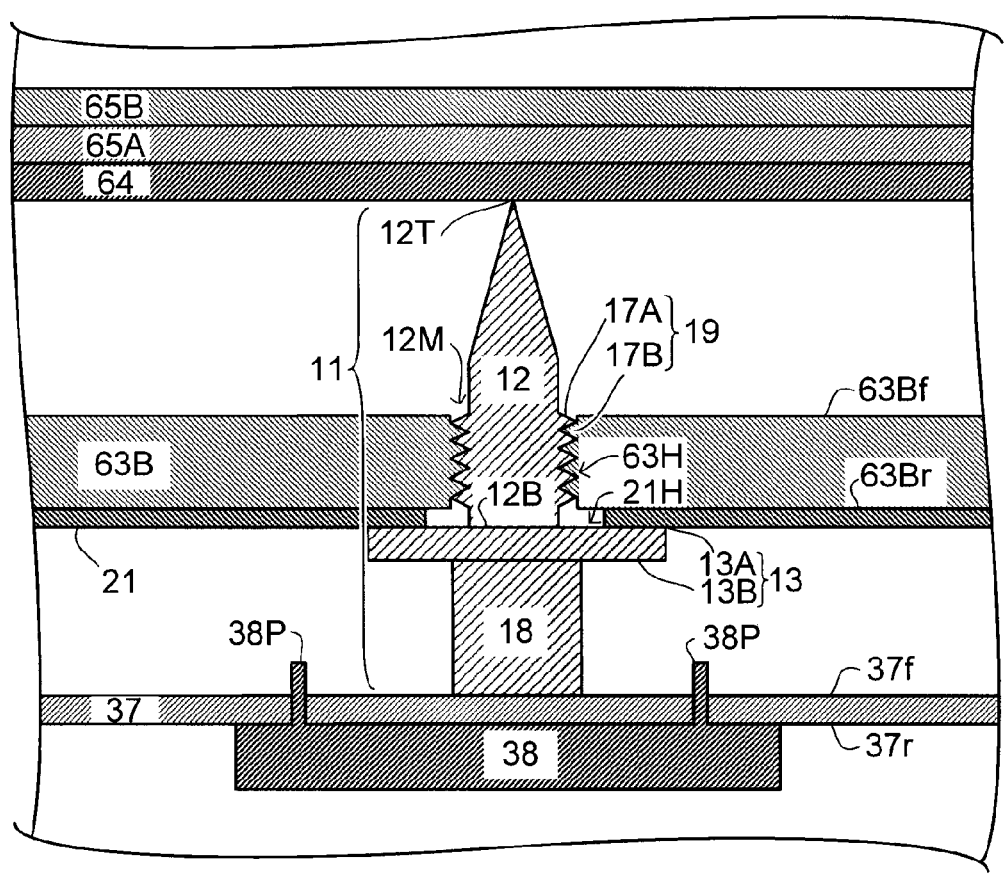
FIG. 10 is a cross-sectional view showing a liquid crystal display device in Embodiment 4 (in a cross section taken in the direction of arrows along a line A4-A4' in FIG. 9).

The description is directed to Embodiment 4. In the following description, the same reference signs are used to denote members having similar functions to the members used in Embodiments 1 to 3, and duplicate descriptions thereof are omitted. Referring to FIGS. 9 and 10, Embodiment 4 describes a backlight unit 69 having similar effects to those provided by Embodiments 1 to 3.

Similarly to FIG. 1, FIG. 9 is a perspective view showing a support unit 11, a bottom portion 63B of a backlight chassis 63, and an insulation sheet 21. FIG. 10 is a cross-sectional view showing a liquid crystal display device 89 (in a cross section taken in the direction of arrows along a line A4-A4' in FIG. 9).

The support unit 11 in Embodiment 4 includes, similarly to Embodiments 1 to 3, a support pin 12, a shield portion 13, and a protruding portion 18 and newly includes an external thread 17A formed on the outer circumference of the support pin 12. This embodiment further includes an internal thread 17B to be engaged with the external thread 17A, which is formed on the inner wall of a chassis opening 63H. The support pin 12 is mounted to the backlight chassis 63 through the engagement between the external thread 17A and the internal thread 17B (it can therefore be said that the external thread 17A and the internal thread 17B constitute a fixing portion 19 that immobilizes the support unit 11 with respect to the backlight chassis 63).

To be more specific, the external thread 17A is formed on the outer circumference of a portion of the support pin 12, which extends from a midpoint 12M to a bottom end 12B of the support pin 12. Thus, as the support pin 12 is passed through a sheet opening 21H and advanced further through the engagement of the external thread 17A with the internal thread 17B of the chassis opening 63H, the shield portion 13 positioned at the bottom end 12B of the support pin 12 is brought close to the sheet opening 21H and then covers the sheet opening 21H.

Similarly to the case of the backlight unit 69 in each of Embodiments 1 to 3, when the shield portion 13 is securely covering the sheet opening 21H, the chassis opening 63H that has an area smaller than an opening area of the sheet opening 21H and overlaps the sheet opening 21H is also covered securely by the shield portion 13.

As a result, an edge region of the chassis opening 63H defined by an edge of the chassis opening 63H and the vicinity thereof, which is exposed from the sheet opening 21H, is not directly brought close to a metal terminal 32P of a power source circuit 32 and a metal terminal 38P of an inverter transformer 38, so that an electric current does not flow from the metal terminals 32P·38P to the edge region of the chassis opening 63H.

Other Embodiments

The present invention is not limited to the foregoing embodiments and may be modified variously without departing from the spirit of the present invention.

For example, the shape of the shield portion 13 is not limited to a circular shape or an ellipsoidal shape and may be a polygonal shape such as a quadrangular shape. The bottom line is that the shape of the shield portion 13 is not particularly limited as long as the shield portion 13 has an area sufficient to cover the sheet opening 21H.

Furthermore, the shape of the support pin 12 is not limited to a circular columnar shape and may be a polygonal columnar shape. The bottom line is that the shape of the support pin 12 is not particularly limited as long as the support pin 12 can be passed through the sheet opening 21H and the chassis opening 63H.

In the foregoing description, a liquid crystal display device that is a display device is used as one example of an electronic apparatus. An electronic apparatus adoptable herein, however, is not limited to a liquid crystal display device (a display device of a type that receives radio waves required for television broadcasting is referred to as a television receiver).

LIST OF REFERENCE SIGNS

11 Support unit
12 Support pin
12T Top end of support pin
12B Bottom end of support pin
12M Midpoint of support pin
13 Shield portion
13A First surface that is one surface of shield portion
13B Second surface that is rear side of first surface of shield portion
14 Hook body (Engaging body)
14L Latch end
14S Support piece
15 Intersecting body (Engaging body, Latch end)
16 Umbrella-shaped body (Engaging body)
16B Skirt portion (Latch end)
17A External thread (Fixing portion)
17B Internal thread (Fixing portion)
18 Protruding portion
19 Fixing portion
21 Insulation sheet
21H Sheet opening (Opening)
31 Power source unit
32 Power source circuit (Circuit)
32P Metal terminal of power source circuit
33 Power source board
33f Front board surface of power source board
33r Rear board surface of power source board
35 Inverter unit
37 Inverter board
37f Front board surface of inverter board
37b Rear board surface of inverter board
38 Inverter transformer (Circuit)
38P Metal terminal of inverter transformer
61 Fluorescent tube
62 Lamp holder
63 Backlight chassis (Chassis)
63H Chassis opening (Opening)
63B Bottom portion of backlight chassis
63Bf Front surface of bottom portion
63Br Rear surface of bottom portion
64 Diffusion sheet
65 Lens sheet
66 Optical sheet group
69 Backlight unit
79 Liquid crystal display panel
89 Liquid crystal display device (Display device)

The invention claimed is:

1. A support unit that is mounted to a chassis by being fitted into an opening included in an insulation sheet and an opening included in a chassis, the opening of the chassis and the opening of the insulation sheet overlapping each other and the chassis and the insulation sheet being adhered to each other, the support unit comprising:
   a support pin including a top end projecting from a front surface of the chassis when the support pin passes through the opening of the chassis and the opening of the insulation sheet;
   a shield portion that is continuous with a bottom end of the support pin and that covers over the sheet opening of the insulation sheet, the insulation sheet being adhered to a rear surface of the chassis; and
   a fixing portion that engages with the chassis so as to immobilize the support unit with respect to the chassis.

2. The support unit according to claim 1, further comprising an engaging body including a latch end that is hooked on an edge of the chassis opening,
   wherein, in the engaging body, the latch end is at a position level with a midpoint between the top end and the bottom end of the support pin, and
   the latch end and the shield portion are continuous with the bottom end of the support pin and sandwich the chassis therebetween to define the fixing portion and to immobilize the support unit with respect to the chassis.

3. The support unit according to claim 2, wherein
   the engaging body is deformed into a shape to be able to pass through the sheet opening and the chassis opening and to then returns from the deformed shape into its original shape such that the latch end is displaced to be hooked on the edge of the chassis opening.

4. The support unit according to claim 2, wherein
the sheet opening and the chassis opening have a linear shape,
the engaging body is continuous with the support pin and has a linear shape to be able to pass through the sheet opening and the chassis opening, and
after being passed through the sheet opening and the chassis opening, the engaging body is rotated around the support pin to intersect with the linear shapes of the two openings such that the latch end is hooked on the edge of the chassis opening.

5. The support unit according to claim 2, wherein
the sheet opening is defined by joining a first main portion that includes an area sufficient to permit passage of the engaging body to a first auxiliary portion that does not allow passage of the engaging body therethrough, but which allows passage of a portion of the support pin, which extends from a midpoint of the support pin to the bottom end of the support pin, to pass therethrough,
the chassis opening is defined by joining a second main portion that includes an area sufficient to permit passage of the engaging body to a second auxiliary portion that does not allow passage of the engaging body therethrough, but which allows passage of the portion of the support pin, which extends from the midpoint of the support pin to the bottom end of the support pin, to pass therethrough, and
after the engaging body is passed through the first main portion and the second main portion, the support pin is slid toward the first auxiliary portion and the second auxiliary portion, and thus, the latch end of the engaging body is hooked on an edge of the second auxiliary portion.

6. The support unit according to claim 1, wherein
an external thread is defined on an outer circumference of the support pin,
an internal thread arranged to be engaged with the external thread is defined on an inner circumference of the chassis opening, and
the external thread and the internal thread are engaged with each other to define the fixing portion that immobilizes the support unit with respect to the chassis.

7. The support unit according to claim 1, wherein
the shield portion includes a first surface that is in contact with the bottom end of the support pin and a second surface that is positioned at a rear side of the first surface, and
the second surface includes a protruding portion that protrudes from the second surface.

8. A backlight unit, comprising:
the support unit according to claim 1; and
an optical sheet that is supported by the top end of the support pin of the support unit.

9. A display device, comprising:
the backlight unit according to claim 8; and
a display panel that receives light from the backlight unit.

10. The display device according to claim 9, wherein
the display panel is a liquid crystal panel defined by of a pair of substrates with liquid crystal sealed therebetween.

11. A television receiver comprising the display device according to claim 9.

12. A television receiver comprising the display device according to claim 10.

13. A backlight unit, comprising:
the support unit according to claim 2; and
an optical sheet that is supported by the top end of the support pin of the support unit.

14. A display device, comprising:
the backlight unit according to claim 13; and
a display panel that receives light from the backlight unit.

15. A backlight unit, comprising:
the support unit according to claim 3; and
an optical sheet that is supported by the top end of the support pin of the support unit.

16. A display device, comprising:
the backlight unit according to claim 15; and
a display panel that receives light from the backlight unit.

17. A backlight unit, comprising:
the support unit according to claim 4; and
an optical sheet that is supported by the top end of the support pin of the support unit.

18. A display device, comprising:
the backlight unit according to claim 17; and
a display panel that receives light from the backlight unit.

19. A backlight unit, comprising:
the support unit according to claim 5; and
an optical sheet that is supported by the top end of the support pin of the support unit.

20. A display device, comprising:
the backlight unit according to claim 19; and
a display panel that receives light from the backlight unit.

* * * * *